US011952514B2

(12) United States Patent
Zhou et al.

(10) Patent No.: US 11,952,514 B2
(45) Date of Patent: Apr. 9, 2024

(54) LOW-TEMPERATURE CURING ADHESIVE COMPOSITIONS

(71) Applicant: PPG Industries Ohio, Inc., Cleveland, OH (US)

(72) Inventors: Hongying Zhou, Allison Park, PA (US); Masayuki Nakajima, Wexford, PA (US); Kar Tean Tan, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 910 days.

(21) Appl. No.: 16/484,345

(22) PCT Filed: Feb. 7, 2018

(86) PCT No.: PCT/US2018/017283
§ 371 (c)(1),
(2) Date: Aug. 7, 2019

(87) PCT Pub. No.: WO2018/148323
PCT Pub. Date: Aug. 16, 2018

(65) Prior Publication Data
US 2019/0390092 A1    Dec. 26, 2019

Related U.S. Application Data

(60) Provisional application No. 62/455,778, filed on Feb. 7, 2017.

(51) Int. Cl.
| | |
|---|---|
| *C09J 163/00* | (2006.01) |
| *B32B 27/38* | (2006.01) |
| *C08G 18/20* | (2006.01) |
| *C08G 18/22* | (2006.01) |
| *C08G 18/28* | (2006.01) |
| *C08G 18/32* | (2006.01) |
| *C08G 18/58* | (2006.01) |
| *C08G 18/76* | (2006.01) |
| *C08G 18/80* | (2006.01) |
| *C08G 59/40* | (2006.01) |
| *C09D 5/24* | (2006.01) |
| *C09J 11/08* | (2006.01) |
| *C09J 175/00* | (2006.01) |

(52) U.S. Cl.
CPC ........ *C09J 175/00* (2013.01); *C08G 18/2072* (2013.01); *C08G 18/227* (2013.01); *C08G 18/2855* (2013.01); *C08G 18/3206* (2013.01); *C08G 18/3215* (2013.01); *C08G 18/3256* (2013.01); *C08G 18/3271* (2013.01); *C08G 18/58* (2013.01); *C08G 18/76* (2013.01); *C08G 18/7621* (2013.01); *C08G 18/7671* (2013.01); *C08G 18/80* (2013.01); *C08G 18/8029* (2013.01); *C08G 18/8074* (2013.01); *C09D 5/24* (2013.01); *C09J 11/08* (2013.01); *C09J 163/00* (2013.01); *C08L 2207/53* (2013.01)

(58) Field of Classification Search
None
See application file for complete search history.

(56) References Cited

U.S. PATENT DOCUMENTS

| | | | |
|---|---|---|---|
| 3,947,338 A | | 3/1976 | Jerabek et al. |
| 4,452,681 A | | 6/1984 | Moriarity |
| 4,452,930 A | | 6/1984 | Moriarity |
| 4,452,963 A | * | 6/1984 | Moriarity ........... C08G 18/8061 560/103 |
| 7,842,762 B2 | | 11/2010 | Zawacky et al. |
| 8,440,860 B2 | | 5/2013 | Van Krieken |
| 8,796,361 B2 | | 8/2014 | Asay et al. |
| 9,149,985 B2 | | 10/2015 | Blank et al. |
| 9,534,074 B2 | | 1/2017 | Eswarakrishnan et al. |
| 9,688,874 B2 | | 6/2017 | Hsu et al. |
| 10,427,722 B2 | | 10/2019 | Blank et al. |
| 2003/0104212 A1 | * | 6/2003 | Agarwal ............ C08G 59/4021 428/416 |
| 2013/0344231 A1 | | 12/2013 | Eswarakrishnan et al. |
| 2015/0114839 A1 | | 4/2015 | Hsu et al. |
| 2017/0327719 A1 | * | 11/2017 | Hoshi .................... C09J 133/04 |

FOREIGN PATENT DOCUMENTS

| | | | |
|---|---|---|---|
| CA | 2169226 A1 | 8/1996 | |
| CN | 102532477 | 7/2012 | |
| CN | 105452320 | 3/2016 | |
| EP | 0118743 A1 | 9/1984 | |
| EP | 0254044 A1 | 1/1988 | |
| WO | WO-0160935 A1 * | 8/2001 | ................ C09J 5/00 |
| WO | WO2008077944 A1 | 7/2008 | |
| WO | 2011163282 A2 | 12/2011 | |
| WO | 2014004273 A1 | 1/2014 | |
| WO | WO-2016084960 A1 * | 6/2016 | ............ C08F 279/02 |

* cited by examiner

*Primary Examiner* — Michael J Feely
(74) *Attorney, Agent, or Firm* — Alicia M. Passerin; Ashley N. Crane

(57) ABSTRACT

Disclosed herein is an adhesive composition comprising: an epoxy-containing component; and a blocked polyisocyanate curing agent comprising a blocking group derived from a blocking agent comprising an alpha-hydroxy amide, ester, or thioester, or a combination thereof. Also disclosed are methods for forming a bonded substrate with the adhesive composition. Also disclosed is an article comprising first and second substrates and the adhesive composition.

24 Claims, No Drawings

LOW-TEMPERATURE CURING ADHESIVE COMPOSITIONS

CROSS-REFERENCE TO RELATED APPLICATIONS

This application claims priority to U.S. Provisional Application No. 62/455,778, entitled "LOW-TEMPERATURE CURING ELECTRODEPOSITABLE COATING COMPOSITIONS", filed on Feb. 7, 2017, which is expressly incorporated herein by reference in its entirety.

FIELD

The present invention relates to adhesive compositions and adhesives.

BACKGROUND

Structural adhesives are utilized in a wide variety of applications to bond together two or more substrate materials. For example, structural adhesives may be used for binding together automotive or industrial components.

The present invention is directed towards adhesive compositions that provide sufficient bond strength and are easy to apply for use in bonding together substrate materials.

SUMMARY

Disclosed herein is an adhesive composition comprising: an epoxy-containing component; and a blocked polyisocyanate curing agent comprising a blocking group derived from a blocking agent comprising an alpha-hydroxy amide, ester, or thioester, or a combination thereof.

Also disclosed herein is a method for forming a bond between two substrates comprising: applying an adhesive comprising an epoxy-containing component, and a blocked polyisocyanate curing agent comprising a blocking group derived from a blocking agent comprising an alpha-hydroxy amide, ester, or thioester, or a combination thereof and contacting a second substrate to the adhesive composition such that the adhesive composition is located between the first and second substrate; and curing the adhesive composition.

Also disclosed is an adhesive formed by at least partially curing an adhesive comprising an epoxy-containing component, and a blocked polyisocyanate curing agent comprising a blocking group derived from a blocking agent comprising an alpha-hydroxy amide, ester, or thioester, or a combination thereof.

Also disclosed is an article comprising a first substrate, a second substrate, and an adhesive comprising an epoxy-containing component, and a blocked polyisocyanate curing agent comprising a blocking group derived from a blocking agent comprising an alpha-hydroxy amide, ester, or thioester, or a combination thereof.

DETAILED DESCRIPTION

For purposes of the following detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. For example, although reference is made herein to "an" epoxy and "a" blocking group, a combination (i.e., a plurality) of these components can be used.

In addition, in this application, the use of "or" means "and/or" unless specifically stated otherwise, even though "and/or" may be explicitly used in certain instances.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

As used herein, the terms "on," "onto," "applied on," "applied onto," "formed on," "deposited on," "deposited onto," mean formed, overlaid, deposited, or provided on but not necessarily in contact with the surface. For example, an adhesive composition "applied onto" a substrate does not preclude the presence of one or more other intervening coating layers of the same or different composition located between the adhesive composition and the substrate.

As used herein, the term "structural adhesive" means an adhesive having a wedge impact strength of at least 10 N/mm (measured according to ISO 11343 by CEAST 9350).

As used herein, "aromatic" refers to a hydrocarbon having a delocalized conjugated π-system with alternating double and single bonds between carbon atoms forming one or more coplanar hydrocarbon rings.

As defined herein, a "1K" or "one-component" adhesive composition is a composition in which all of the ingredients may be premixed and stored and wherein the reactive components do not readily react at ambient or slightly thermal conditions, but instead only react upon activation by an external energy source. In the absence of activation from the external energy source, the composition will remain largely unreacted (having less than a 100% increase in viscosity when stored at 25° C. for 90 days, where viscosity is measured with an Anton Paar Physica MCR 301 rheometer with 25 mm parallel plate and 1 mm gap at the following shear conditions: Conditioning: Rotation with shear rate at 0.1 s$^{-1}$ for 60 seconds; Tempering: No shear for 240 seconds; Amplitude test: Oscillation with log increasing strain from 0.01 to 10% in 90 seconds (data measured every 3 seconds); Shear phase: Oscillation with 10% strain (y) at 10 Hz for 120 seconds (data measured every 10 seconds); Re-conditioning: Rotation with shear rate at 0.1 s$^{-1}$ for 60 seconds; Regenerated mode: Oscillation with 0.05% strain (y) for 120 seconds (data measured every 10 seconds)). External energy sources that may be used to promote the curing reaction (i.e., the crosslinking of the epoxy component and the curing agent) include, for example, radiation (i.e., actinic radiation such as ultraviolet light) and/or heat.

As defined herein, a "2K" or "two-component" adhesive composition is a composition in which at least a portion of the reactive components readily react and cure without activation from an external energy source, such as at ambient or slightly thermal conditions, when mixed. One of skill in the art understands that the two components of the adhesive composition are stored separately from each other and mixed just prior to application of the adhesive composition.

As further defined herein, ambient conditions generally refer to room temperature and humidity conditions or temperature and humidity conditions that are typically found in the area in which the adhesive is being applied to a substrate, e.g., at 20° C. to 40° C. and 20% to 80% relative humidity, while slightly thermal conditions are temperatures that are slightly above ambient temperature but are generally below the curing temperature for the adhesive composition (i.e. in other words, at temperatures and humidity conditions below which the reactive components will readily react and cure, e.g., >40° C. and less than 100° C. at 20% to 80% relative humidity).

As used herein, the term "polymer" is meant to refer to prepolymers, oligomers, homopolymers, copolymers, and blends or mixtures thereof.

As used herein, "Mw" refers to the weight average molecular weight and means the theoretical value as determined by Gel Permeation Chromatography relative to linear polystyrene standards of 800 to 900,000 Da and may be performed using Waters 2695 separation module with a Waters 2414 differential refractometer (RI detector). Tetrahydrofuran (THF) was used as the eluent at a flow rate of 1 ml min$^{-1}$, and two PL Gel Mixed C columns were used for separation at room temperature.

As used herein, the term "catalyst" means a substance that increases the rate of a chemical reaction without itself undergoing any permanent chemical change.

As used herein, unless indicated otherwise, the term "substantially free" means that a particular material is not purposefully added to a mixture or composition, respectively, and is only present as an impurity in a trace amount of less than 1% by weight based on a total weight of the mixture or composition, respectively. As used herein, unless indicated otherwise, the term "completely free" means that a mixture or composition, respectively, does not comprise a particular material, i.e., the mixture or composition comprises 0% by weight of such material.

The present invention is directed to a curing component comprising, or in some cases consisting of, or in some cases consisting essentially of a blocked polyisocyanate curing agent comprising a blocking group derived from a blocking agent comprising an alpha-hydroxy amide, ester or thioester, or combinations thereof. The curing component may react with an epoxy-containing component upon activation from an external energy source, such as, for example, applying heat at a temperature of at least 100° C. The polyisocyanate may be blocked with the blocking group described above in the absence of an external energy source. Upon application of the external energy source, the curing component may react with the epoxy-containing component as a result of the removal of the blocking group for the polyisocyanate. As used herein, a "blocked polyisocyanate" means a polyisocyanate wherein at least a portion of the isocyanato groups are blocked by a blocking group introduced by the reaction of a free isocyanato group with a blocking agent. Therefore, a blocked polyisocyanate may comprise a polyisocyanate reacted with one or more blocking agent(s). As used herein, a "blocking agent" refers to a compound comprising a functional group reactive with an isocyanato group present on the polyisocyanate resulting in binding a residual moiety of the blocking agent to the isocyanato group so that it is stable to active hydrogen functional groups at room temperature (i.e., 23° C.). The bound residual moiety of a blocking agent, which provides stability to active hydrogen functional groups at room temperature is referred to as a "blocking group" herein. Blocking groups may be identified by reference to the blocking agent from which they are derived by reaction with an isocyanato group. Blocking groups may be removed under suitable conditions, such as at elevated temperatures such that the free isocyanato groups may be generated from the blocked isocyanato groups. Thus, the reaction with the blocking agent may be reversed at elevated temperature such that the previously blocked isocyanato group is free to react with active hydrogen functional groups. As used herein, the term "derived from" with respect to the blocking group of the blocked polyisocyanate is intended to refer to the presence of the residue of a blocking agent in the blocking group and is not intended to be limited to a blocking group produced by reaction of an isocyanato group of the polyisocyanate with the blocking agent. Accordingly, a blocking group of the present invention resulting from synthetic pathways that do not include direct reaction of the isocyanato group and blocking agent, as explained in more detail below, will still be considered to be "derived from" the blocking agent. As used herein, the term "blocked" polyisocyanate collectively refers to a fully blocked polyisocyanate and an at least partially blocked polyisocyanate. As used herein, a "fully blocked polyisocyanate" refers to a polyisocyanate wherein each of the isocyanato groups has been blocked with a blocking group. As used herein, an "at least partially blocked polyisocyanate" refers to a polyisocyanate wherein at least a portion of the isocyanato groups have been blocked with a blocking group while the remaining isocyanato groups have been reacted with a portion of the polymer backbone.

The polyisocyanates that may be used in preparing the blocked polyisocyanate of the present invention include any suitable polyisocyanate known in the art. A polyisocyanate is an organic compound comprising at least two, at least three, at least four, or more isocyanato functional groups. For example, the polyisocyanate may comprise aliphatic and/or aromatic polyisocyanates. As will be understood, an aromatic polyisocyanate will have a nitrogen atom of an isocyanate group covalently bound to a carbon present in an aromatic group, and an aliphatic polyisocyanate may contain an aromatic group that is indirectly bound to the isocyanato group through a non-aromatic hydrocarbon group. Aliphatic polyisocyanates may include, for example, (i) alkylene isocyanates, such as trimethylene diisocyanate, tetramethylene diisocyanate, pentamethylene diisocyanate, hexamethylene diisocyanate ("HDI"), 1,2-propylene diisocyanate, 1,2-butylene diisocyanate, 2,3-butylene diisocyanate, 1,3-butylene diisocyanate, ethylidene diisocyanate, and butylidene diisocyanate, and (ii) cycloalkylene isocyanates, such as 1,3-cyclopentane diisocyanate, 1,4-cyclohexane diisocyanate, 1,2-cyclohexane diisocyanate, isophorone diisocyanate, methylene bis(4-cyclohexylisocyanate) ("HMDI"), the cyclo-trimer of 1,6-hexmethylene diisocyanate (also known as the isocyanurate trimer of HDI, commercially available as Desmodur N3300 from Convestro AG), and meta-tetramethylxylylene diisocyanate (commercially available as TMXDI® from Allnex SA). Aromatic polyisocyanates may include, for example, (i) arylene isocyanates, such as m-phenylene diisocyanate, p-phenylene diisocyanate, 1,5-naphthalene diisocyanate and 1,4-naphthalene diisocyanate, and (ii) alkarylene isocyanates, such as 4,4'-diphenylene methane diisocyanate ("MDI"), 2,4-tolylene or 2,6-tolylene diisocyanate ("TDI"), or mixtures thereof, 4,4-toluidine diisocyanate and xylylene diisocyanate. Triisocyanates, such as triphenyl methane-4,4',4"-triisocyanate, 1,3,5-triisocyanato benzene and 2,4,6-triisocyanato toluene, tetraisocyanates, such as 4,4'-diphenyldimethyl methane-2,2',5,5'-tetraisocyanate, and polymerized polyisocyanates, such as tolylene diisocyanate dimers and trimers and the like, may also be used. Combinations of polyisocyanates may be used.

According to the present invention, the blocked polyisocyanate curing agent comprises a blocking group derived from a blocking agent comprising an alpha-hydroxy amide, ester or thioester. As used herein, the term "alpha-hydroxy amide" refers to an organic compound having at least one alpha-hydroxy amide moiety that includes a hydroxyl functional group covalently bonded to an alpha-carbon of an amide group. As used herein, the term "alpha-hydroxy ester" refers to an organic compound having at least one alpha-hydroxy ester moiety that includes a hydroxyl functional group covalently bonded to an alpha-carbon of an ester group. As used herein, the term "alpha-hydroxy thioester" refers to an organic compound having at least one alpha-hydroxy thioester moiety that includes a hydroxyl functional group covalently bonded to an alpha-carbon of a thioester group. The blocking agent comprising an alpha-hydroxy amide, ester or thioester may comprise a compound of structure (I):

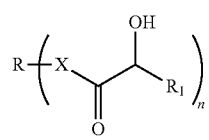

(I)

wherein X is N(R$_2$), O, S; n is 1 to 4; when n=1 and X=N(R$_2$), R is hydrogen, a C$_1$ to C$_{10}$ alkyl group, an aryl group, a polyether, a polyester, a polyurethane, a hydroxy-alkyl group, or a thio-alkyl group; when n=1 and X=O or S, R is a C$_1$ to C$_{10}$ alkyl group, an aryl group, a polyether, a polyester, a polyurethane, a hydroxy-alkyl group, or a thio-alkyl group; when n=2 to 4, R is a multi-valent C$_1$ to C$_{10}$ alkyl group, a multi-valent aryl group, a multi-valent polyether, a multi-valent polyester, a multi-valent polyurethane; each R$_1$ is independently hydrogen, a C$_1$ to C$_{10}$ alkyl group, an aryl group, or a cycloaliphatic group; each R$_2$ is independently hydrogen, a C$_1$ to C$_{10}$ alkyl group, an aryl group, a cycloaliphatic group, a hydroxy-alkyl group, or a thio-alkyl group; and R and R$_2$ together can form a cycloaliphatic, heterocyclic structure. The cycloaliphatic, heterocyclic structure may comprise, for example, morpholine, piperidine, or pyrrolidine. It should be noted that R can only be hydrogen if X is N(R$_2$).

As used herein, "alkyl" refers to a hydrocarbon chain that may be linear or branched and may comprise one or more hydrocarbon rings that are not aromatic. As used herein, "aryl" refers to a hydrocarbon having a delocalized conjugated π-system with alternating double and single bonds between carbon atoms forming one or more coplanar hydrocarbon rings. As used herein, "cycloaliphatic" refers to a hydrocarbon that comprises one or more hydrocarbon rings that are not aromatic. As used herein, the term "polyether" refers to hydrocarbons having more than one ether group, and may optionally comprise other functional groups such as hydroxyl or amino groups. As used herein, the term "polyester" refers to hydrocarbon compounds having more than one ester group, and may optionally comprise other functional groups such as hydroxyl or amino groups. As used herein, the term "polyurethane" refers to hydrocarbon compounds having more than one urethane group, and may optionally comprise other functional groups such as hydroxyl or amino groups. As used herein, the term "hydroxy-alkyl group" refers to an alkyl group having a hydroxyl functional group. As used herein, the term "thio-alkyl group" refers to an alkyl group having a thiol functional group.

The alpha-hydroxy amide blocking agent may comprise a substituted glycolamide. As used herein, the term "substituted glycolamide" refers to a glycolamide compound having at least one of the hydrogen atoms bonded to the nitrogen atom substituted for a substituent such as a monovalent organic group. A substituted glycolamide, with reference to Structure (I), comprises a compound wherein X is N(R$_2$); R$_1$ is hydrogen; each R$_2$ is independently hydrogen, a C$_1$ to C$_{10}$ alkyl group, an aryl group, a cycloaliphatic group, a hydroxy-alkyl group, or a thio-alkyl group; and R is a C$_1$ to C$_{10}$ alkyl group, an aryl group, a cycloaliphatic group, a polyether, a polyester, a polyurethane, a hydroxy-alkyl group, or a thio-alkyl group. Accordingly, the substituted glycolamide may comprise an alkyl glycolamide, an aryl glycolamide, a polyether glycolamide, a polyester glycolamide, a polyurethane glycolamide, a hydroxy-alkyl glycolamide, or a thio-alkyl glycolamide. Each of these compounds may be mono- or di-substituted, such as, for example, with reference to the alkyl glycolamide, a mono-alkyl glycolamide or di-alkyl glycolamide. Specific non-limiting examples of the mono-alkyl glycolamide include, for example, methyl glycolamide, ethyl glycolamide, propyl glycolamide, isopropyl glycolamide, butyl glycolamide, pentyl glycolamide, hexyl glycolamide, heptyl glycolamide, octyl glycolamide, ethyl-hexyl glycolamide, nonyl glycolamide, decyl glycolamide, and the like, and specific examples of the di-alkyl glycolamide comprise any of the mon-alkyl glycolamide with an additional alkyl substituent, such as dimethyl glycolamide, di-ethyl glycolamide, dibutyl glycolamide, dipentyl glycolamide, and the like.

Additionally, the substituted glycolamide blocking agent may comprise more than one glycolamide groups, such as, with reference to Structure (I), when n is greater than 1. It should be understood that when n is 1 the R group is univalent and when n is greater than 1 the R group is multi-valent, such as a multi-valent C$_1$ to C$_{10}$ alkyl group, aryl group, cycloaliphatic group, polyether, polyester, or polyurethane polymer.

The alpha-hydroxy amide blocking agent may alternatively or additionally comprise a substituted lactamide. As used herein, the term "substituted lactamide" refers to a lactamide compound having at least one of the hydrogen atoms bonded to the nitrogen atom substituted for a substituent such as a monovalent organic group. A substituted lactamide, with reference to Structure (I), comprises a compound wherein X is $N(R_2)$; $R_1$ is methyl; each $R_2$ is independently hydrogen, a $C_1$ to $C_{10}$ alkyl group, an aryl group, a cycloaliphatic group, a hydroxy-alkyl group, or a thio-alkyl group; and R is a $C_1$ to $C_{10}$ alkyl group, an aryl group, a cycloaliphatic group, a polyether, a polyester, a polyurethane, a hydroxy-alkyl group, or a thio-alkyl group. Accordingly, the substituted lactamide may comprise an alkyl lactamide, an aryl lactamide, a polyether lactamide, a polyester lactamide, a polyurethane lactamide, a hydroxy-alkyl lactamide, or a thio-alkyl lactamide. Each of these compounds may be mono- or di-substituted, such as, for example, with reference to the alkyl lactamide, a mono-alkyl lactamide or di-alkyl lactamide. Non-limiting specific examples of the mono-alkyl lactamide include methyl lactamide, ethyl lactamide, propyl lactamide, isopropyl lactamide, butyl lactamide, pentyl lactamide, hexyl lactamide, heptyl lactamide, octyl lactamide, ethyl-hexyl lactamide, nonyl lactamide, decyl lactamide, and the like, and specific examples of the di-alkyl lactamide include di-methyl lactamide, di-ethyl lactamide, di-propyl lactamide, di-butyl lactamide, di-pentyl lactamide, di-hexyl lactamide, and the like.

Additionally, the substituted lactamide blocking agent may comprise more than one lactamide groups, such as, with reference to Structure (I), when n is greater than 1. It should be understood that when n is 1 the R group is univalent and when n is greater than 1 the R group is multi-valent, such as a multi-valent $C_1$ to $C_{10}$ alkyl group, aryl group, cycloaliphatic group, polyether, polyester, or polyurethane polymer.

The alkyl glycolamide or the alkyl lactamide blocking group of the present invention may comprise, for example, a compound of the structure:

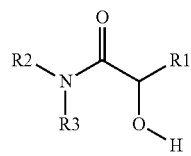

wherein R1 is hydrogen or a methyl group; R2 is a $C_1$ to $C_{10}$ alkyl group; and R3 is hydrogen, a $C_1$ to $C_{10}$ alkyl group. It will be understood that R1 is a methyl group in the alkyl lactamide.

According to the present invention, a blocking agent that may be used to prepare the blocked polyisocyanate may be a racemic lactamide blocking agent. As used herein, the term "racemic lactamide" or "racemic lactamide blocking agent" refers to a mixture of lactamide stereoisomers that may comprise 20% to 80% by weight, such as 30% to 70% by weight, such as 40% to 60% by weight, such as about 50% by weight of a lactamide having an R stereocenter, and 20% to 80% by weight, such as 30% to 70% by weight, such as 40% to 60% by weight, such as about 50% by weight of a lactamide having an S stereocenter, based on the total weight of the mixture of lactamide stereoisomers. Accordingly, the blocked polyisocyanate may comprise a blocking group derived from a racemic lactamide blocking agent, i.e., blocking groups derived from lactamide(s) of the mixture of lactamide stereoisomers. For simplicity, a blocking group derived from a racemic lactamide blocking agent may be referred to as a "racemic lactamide blocking group."

The racemic lactamide may be produced by reacting a meso-lactide with an alkyl amine. A lactide has the general formula 3,6-dimethyl-1,4-dioxane-2,5-dione and includes two stereocenters at the methyl substituents. As will be appreciated by those skilled in the art, a meso-lactide is not chiral and, therefore, not optically active because it includes one R stereocenter and one S stereocenter. In contrast, D-lactide and L-lactide isomers will include either two R or two S stereocenters and may exclusively form lactamides having either the R or S stereocenter, respectively. The alkyl amine compound is not limited and may comprise any suitable compound comprising a primary or secondary amino group. For example, the alkyl amine may comprise a monoalkyl or dialkyl amine having the general formula $R_1N(H)R_2$ wherein $R_1$ is hydrogen or an aliphatic, cycloaliphatic or aromatic group and $R_2$ is an aliphatic, cycloaliphatic or aromatic group. The alkyl group may comprise, for example, methyl, ethyl, propyl, isopropyl, butyl, sec-butyl, pentyl, hexyl groups and the like, and the alkyl group may be substituted with other functional groups such as thiol or hydroxyl functional groups, a sulfur linkage, ether linkage or ester linkage, etc. For example, the substituted monoalkyl amine may comprise a polyetheramine such as monoamines available under the trade name JEFFAMINE® from Huntsman Corporation. The dialkyl amine comprises two alkyl groups and may comprise combinations of two different alkyl groups such as, e.g., methylethyl amine. The racemic lactamide produced by reacting the meso-lactide and alkyl amine may result in two lactamide compounds with one having an R stereocenter and one having an S stereocenter and each compound including the residue of the alkyl amine. For example, the reaction of meso-lactide and butyl amine illustrated below in Scheme 1 results in a butyl lactamide having an R stereocenter and a butyl lactamide having an S stereocenter, and the two molecules may together be referred to as racemic butyl lactamide. Likewise, the selection of a different alkyl amine will result in a racemic lactamide having the alkyl group of the selected amine. As such, the racemic lactamide may comprise racemic alkyl lactamide or racemic dialkyl lactamide. Non-limiting examples of racemic alkyl and dialkyl lactamides may include racemic methyl lactamide, racemic ethyl lactamide, racemic propyl lactamide, racemic butyl lactamide, racemic propyl lactamide, racemic hexyl lactamide, racemic dimethyl lactamide, racemic diethyl lactamide, racemic dipropyl lactamide, racemic dibutyl lactamide, racemic dipropyl lactamide, racemic dihexyl lactamide, racemic methylethyl lactamide, racemic ethyl propyl lactamide, racemic propyl butyl lactamide, racemic butylpropyl lactamide, racemic propyl hexyl lactamide, and racemic cyclohexyl lactamide.

Scheme 1

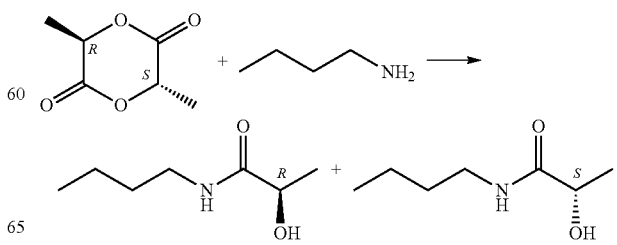

The racemic lactamide may also be produced by reacting a racemic mixture of alkyl lactate with an alkyl amine. An alkyl lactate has the general formula X-2-hydroxypropanoate wherein the X represents an alkyl group such as methyl, ethyl, propyl, butyl, pentyl, hexyl, etc. Each individual alkyl lactate molecule will have either an R or an S stereocenter, and the racemic mixture will collectively have an approximately equal proportion of R and S isomers such that the racemic mixture is not optically active. The use of a racemic mixture of alkyl lactate allows for the production of a "racemic lactamide" as defined herein upon reaction with the alkyl amine. For example, the reaction of a racemic mixture of ethyl lactate and methyl amine illustrated below in Scheme 2 results in a racemic mixture of methyl lactamide, which may be referred to herein as racemic methyl lactamide, and ethanol byproduct. Any of the alkyl amines listed above may be reacted with the alkyl lactate to form a racemic lactamide.

Scheme 2

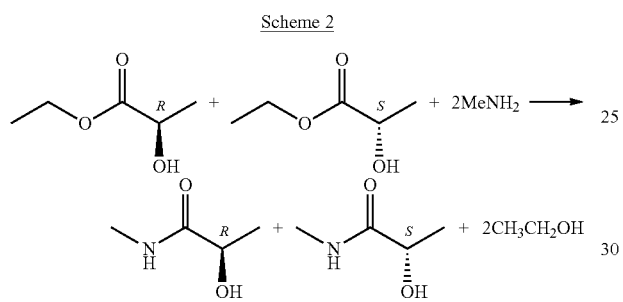

It has been surprisingly discovered that the use of a racemic lactamide blocking group results in a blocked polyisocyanate that is non-crystalline. As used herein, a "non-crystalline" blocked polyisocyanate refers to a blocked polyisocyanate that, when in a static state, is in a liquid state at room temperature (e.g., 25° C.) and remains in a liquid state at room temperature for a period of at least 30 days. In contrast, a "crystalline" blocked polyisocyanate refers to a blocked polyisocyanate in the form of solid crystals at room temperature, or if in a liquid state at room temperature, will form solid crystals at room temperature over a period of less than 30 days, such as, e.g., less than 7 days.

It will be understood by those skilled in the art that an at least partially blocked polyisocyanate by virtue of its incorporation into the polymeric backbone will also be non-crystalline. Therefore, a lactamide produced from a chiral lactide or lactate and used as a blocking agent for blocking isocyanato groups of an at least partially blocked polyisocyanate may form a non-crystalline at least partially blocked polyisocyanate.

The blocked polyisocyanate curing agent comprising a blocking group derived from a blocking agent comprising an alpha-hydroxy amide, ester or thioester may also be produced by synthetic methods that do not involve direct reaction of an isocyanato group with the blocking agent. For example, a blocked polyisocyanate curing agent comprising a blocking group derived from a blocking agent comprising an alpha-hydroxy amide may be produced by a two-step synthetic process wherein in a first step a polyisocyanate is reacted with an alpha-hydroxyester, and a second step wherein the resulting product is further reacted with an alkyl amine. An exemplary reaction pathway identified as Scheme 3 is produced below, wherein a polyisocyanate identified as R—NCO (wherein R is a multi-valent organic moiety including at least one other isocyanato group (not shown)) reacts with an alpha-hydroxy ester (wherein R is a monovalent organic group) in a first step, and the reaction product is further reacted with a primary or secondary amine (RN(H)R, wherein each R individually corresponds to either R or $R_2$ as defined above) to produce a blocked polyisocyanate curing agent according to the present invention.

Scheme 3

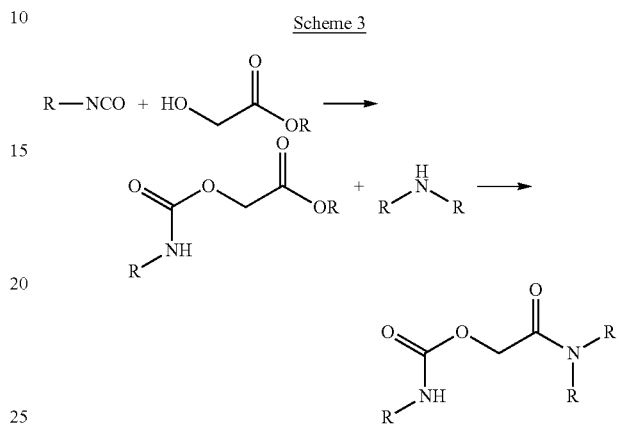

Another exemplary alternative synthetic pathway for producing blocked polyisocyanate curing agent comprising a blocking group derived from a blocking agent comprising an alpha-hydroxy amide includes a two-step synthetic process wherein in a first step a dialkyl carbonate is reacted with an alpha-hydroxy amide, and a second step wherein the resulting product is further reacted with an alkyl amine. An exemplary reaction pathway identified as Scheme 4 is produced below, wherein a carbonate (wherein each R is individually a mono-valent organic group) is reacted with an alpha-hydroxy amide (wherein each R individually corresponds to either R or $R_2$ as defined above) in a first step, and the reaction product is further reacted with a primary or secondary amine (wherein one R corresponds to a multi-valent organic moiety and one R corresponds to hydrogen) to produce a blocked polyisocyanate curing agent according to the present invention.

Scheme 4

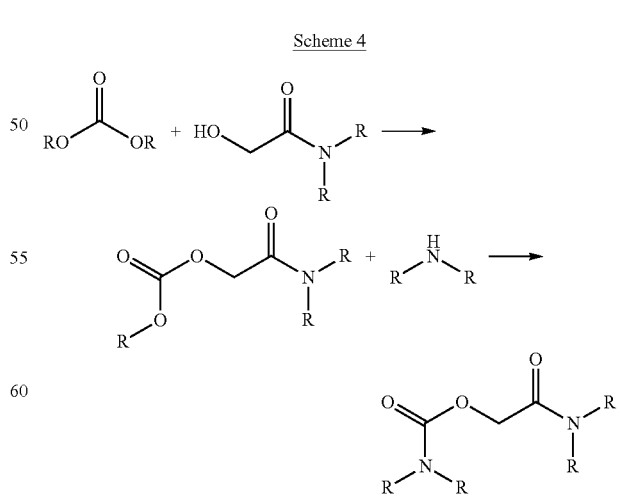

The blocking agent comprising an alpha-hydroxy amide, ester or thioester may block at least 10% of the total blocked isocyanato groups of the blocked polyisocyanate, such as at least 50% of the total blocked isocyanato groups, such as at least 65% of the total blocked isocyanato groups, such as at least 80% of the total blocked isocyanato groups, such as at least 95% of the total blocked isocyanato groups, such as 100% of the total blocked isocyanato groups. The blocking agent comprising an alpha-hydroxy amide, ester or thioester may block 10% to 100% of the total blocked isocyanato groups of the blocked polyisocyanate, such as 50% to 100% of the total blocked isocyanato groups, such as 65% to 100% of the total blocked isocyanato groups, such as 80% to 100% of the total blocked isocyanato groups, such as 95% to 100% of the total blocked isocyanato groups. As used herein, "total blocked isocyanato groups" refers to isocyanato groups of the polyisocyanate that are blocked by a blocking group and would otherwise be unblocked or free to react.

According to the present invention, the blocked polyisocyanate may optionally comprise a second blocking group in addition to and different from the blocking group derived from the blocking agent comprising an alpha-hydroxy amide, ester or thioester. As used herein, the term "second blocking group" refers to one or more further blocking groups in addition the blocking groups blocked by the alpha-hydroxy amide, ester or thioester blocking agent, and is not intended to limit the number of different blocking groups present in the blocked polyisocyanate. The second blocking group may comprise any suitable blocking group known in the art. For example, the second blocking group may be derived from an alcohol or a phenolic compound as a blocking agent. Alcohols that may be used as a blocking agent for the second blocking group comprise aliphatic, cycloaliphatic and aromatic alkyl monoalcohols and phenolic compounds such as, for example, lower aliphatic alcohols, such as methyl, ethyl, chloroethyl, propyl, butyl, amyl, hexyl, heptyl, octyl, or nonyl alcohol, 3,3,5-trimethylhexanol, decyl and lauryl alcohols and the like; aromatic alkyl alcohols, such as phenylcarbinol, methylphenylcarbinol, and the like; glycol compounds, such as ethyl glycol monoethyl ether, ethyl glycol monobutyl ether and the like; and hydroxyketone compounds, such as hydroxyacetone and the like. Phenolic compounds that may be used as blocking agent for the second blocking group may comprise phenol, cresol, xylenol, nitrophenol, chlorophenol, ethyl phenol, t-butyl phenol and 2,5-di-t-butyl-4-hydroxy toluene. Minor amounts of even higher molecular weight, relatively non-volatile monoalcohols may be used, if desired, to serve as plasticizers in the coatings provided by the present invention. The second blocking group may also be derived from other blocking agents comprising tertiary hydroxyl amines such as diethylethanolamine, oximes such as methylethyl ketone oxime, acetone oxime and cyclohexanone oxime, and amines such as diisopropylamine, diethyl malonate ("DEM") and dimethylpyrazole ("DMP"). The second blocking group may also be derived from a combination of two or more of any of the above described blocking agents.

The second blocking group, if present at all, may block at least 0.1% of the total blocked isocyanato groups of the blocked polyisocyanate, and may block no more than 90% of the total blocked isocyanato groups, such as no more than 50% of the total blocked isocyanato groups, such as no more than 35% of the total blocked isocyanato groups, such as no more than 20% of the total blocked isocyanato groups, such as no more than 5% of the total blocked isocyanato groups. The second blocking group, when present, may block 0.1% to 90% of the total blocked isocyanato groups of the blocked polyisocyanate, such as 0.1% to 50% of the total blocked isocyanato groups, such as 0.1% to 35% of the total blocked isocyanato groups, such as 0.1% to 20% of the total blocked isocyanato groups, such as 0.1% to 5% of the total blocked isocyanato groups.

As mentioned above, the blocked polyisocyanate may be a fully blocked polyisocyanate wherein the isocyanato groups of the polyisocyanate are blocked with one or more of the blocking groups discussed above. According to the present invention, a fully blocked polyisocyanate may have a blocking group that blocks each of the isocyanato groups of the polyisocyanate, i.e., 100% of the isocyanato groups are blocked with blocking groups and no isocyanato groups remain unblocked or free to react. However, a blocked polyisocyanate may have fewer than 100% of the isocyanato groups blocked as long as the coating composition remains a stable dispersion, as defined herein.

Additionally, the blocked polyisocyanate may also be an at least partially blocked polyisocyanate as discussed above. The at least partially blocked polyisocyanate may be partially blocked with one or more of the blocking groups discussed above with the remaining isocyanato groups reacted with the polymer backbone, such as described in U.S. Pat. No. 3,947,338, at col. 2, line 65 through col. 5, line 33, the cited portion of which is herein incorporated by reference. For the purposes of determining the percentages of blocking groups present in the blocked polyisocyanate only, isocyanato groups that have been reacted with the polymer backbone should not be included as part of the total blocked isocyanato groups of the blocked polyisocyanate. Accordingly, a blocked polyisocyanate comprising, for example, a blocking group derived from a blocking agent comprising an alpha-hydroxy amide, ester or thioester blocking 100% of the total isocyanato groups of the blocked polyisocyanate includes an at least partially blocked polyisocyanate wherein the blocking group derived from a blocking agent comprising an alpha-hydroxy amide, ester or thioester blocks 100% of the isocyanato groups that are not reacted with the polymer backbone. An at least partially blocked polyisocyanate may have a blocking group that blocks each of the isocyanato groups of the polyisocyanate that have not been reacted with the polymer backbone, i.e., 100% of the total isocyanato groups are blocked with blocking groups and no isocyanato groups remain unblocked or free to react. However, an at least partially blocked polyisocyanate also may have fewer than 100% of the total isocyanato groups blocked as long as the coating composition remains a stable dispersion, as defined herein.

The blocked polyisocyanate may be selected so as to provide a coating composition that cures at low temperatures. As will be understood by one skilled in the art, the temperature at which the coating composition will cure is dependent upon a number of factors including, for example, the blocking group(s) used to block the polyisocyanate, the ratio of blocking groups used to block the polyisocyanate, and any curing catalysts present in the dispersion. As will be further discussed below, the combination of the blocked polyisocyanate, discussed above, and a curing catalyst, discussed below, results in a coating composition that cures at low temperatures due to an unexpected and surprising synergistic effect. As used herein, "low temperatures" with respect to the curing of a coating composition refers to temperatures of 130° C. or below.

As used herein, the term "cure", "cured" or similar terms, as used in connection with the adhesive composition described herein, means that at least a portion of the components that form the adhesive composition are crosslinked to form a coating. Additionally, curing of the adhesive composition refers to subjecting said composition to curing conditions (e.g., elevated temperature) leading to the reaction of the reactive functional groups of the components of the adhesive composition, and resulting in the crosslinking of the components of the composition and formation of an at least partially cured coating. As used herein, the term "at least partially cured" with respect to an adhesive refers to an adhesive formed by subjecting the adhesive composition to curing conditions such that a chemical reaction of at least a portion of the reactive groups of the components of the adhesive composition occurs to form an adhesive. An adhesive composition may be considered to be "at least partially cured" if it has a wedge impact of at least 10 N/mm (measured according to ISO 11343 by CEAST 9350). The coating composition may also be subjected to curing conditions such that a substantially complete cure is attained and wherein further curing results in no significant further improvement in the coating properties such as, for example, increased wedge impact performance.

The blocked polyisocyanate curing agent of the present invention may be according to the structure:

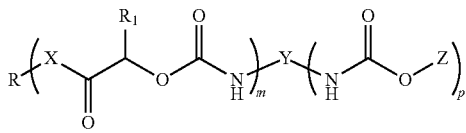

wherein Y represents a multi-valent organic moiety; m≥1; and p≥0; X is $N(R_2)$, O, S; when X=$N(R_2)$, R is hydrogen, a $C_1$ to $C_{10}$ alkyl group, an aryl group, a polyether, a polyester, a polyurethane, a hydroxy-alkyl group, or a thio-alkyl group; when X=O or S, R is a $C_1$ to $C_{10}$ alkyl group, an aryl group, a polyether, a polyester, a polyurethane, a hydroxy-alkyl group, or a thio-alkyl group; each $R_1$ is independently hydrogen, a $C_1$ to $C_{10}$ alkyl group, an aryl group, or a cycloaliphatic group; when m≥2, R is optionally a multi-valent $C_1$ to $C_{10}$ alkyl group, a multi-valent aryl group, a multi-valent polyether, a multi-valent polyester, a multi-valent polyurethane; each $R_2$ is independently hydrogen, a $C_1$ to $C_{10}$ alkyl group, an aryl group, a cycloaliphatic group, a hydroxy-alkyl group, or a thio-alkyl group; R and $R_2$ together can form a cycloaliphatic, heterocyclic structure; and O—Z represents the residue of a second blocking agent.

As used herein, the term "multi-valent" refers to an organic moiety having two or more bonding sites through which the organic moiety is covalently bonds to other organic moieties. For example, a polyisocyanate is multi-valent because it includes two or more isocyanato groups through which it covalently bonds with other organic moieties. The organic moiety may be, for example, an alkyl group, a cycloaliphatic group, an aryl group, a polyether, a polyester, a polyurethane, and the like.

As used herein, the term "mono-valent" refers to an organic moiety having one bonding site through which the organic moiety is covalently bonded to another organic moiety. Although mono-valent is used to refer to an organic moiety having only one bonding site, that does not preclude the presence of other functional groups through which the organic moiety may bind to additional organic moieties, such as, for example, during cure.

The present invention is further directed to an adhesive composition, such as a one-component adhesive composition, comprising, or in some cases consisting of, or in some cases consisting essentially of, an epoxy-containing component; and the curing component described above. It will be appreciated that the curing component is chosen so as to chemically react with the epoxy-containing component upon activation from an external energy source.

Useful epoxy-containing components that can be used include polyepoxides, epoxy adducts, or combinations thereof. Suitable polyepoxides include polyglycidyl ethers of Bisphenol A, such as Epon® 828 and 1001 epoxy resins, and Bisphenol F diepoxides, such as Epon® 862, which are commercially available from Hexion Specialty Chemicals, Inc. Other useful polyepoxides include polyglycidyl ethers of polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, and epoxy novolac resins. Still other non-limiting epoxy compounds include epoxidized Bisphenol A novolacs, epoxidized phenolic novolacs, epoxidized cresylic novolac, and triglycidyl p-aminophenol bismaleiimide.

Other suitable epoxy-containing components include epoxy-adducts such as epoxy polyesters formed as the reaction product of reactants comprising an epoxy-containing compound, a polyol and an anhydride, as described in U.S. Pat. No. 8,796,361, col. 3, line 42 through col. 4, line 65, the cited portion of which is incorporated herein by reference.

According to the present invention, the epoxy-containing component may be present in the adhesive composition in an amount of at least 50% by weight based on the total composition weight, such as at least 60%, such as at least 70%, and in some cases may be present in the adhesive composition in an amount of no more than 95% by weight based on the total composition weight, such as no more than 90%, such no more than 80%. According to the present invention, the epoxy-containing component may be present in the adhesive composition in an amount of from 50% to 95% by weight based on the total composition weight, such as from 70% to 90% or from 60% to 80%.

According to the present invention, the epoxy equivalent weight of the epoxy-containing component of the adhesive composition may be at least 99 g/eq, such as at least 180 g/eq, such as at least 520 g/eq, such as at least 1,000 g/eq, and in some cases may be no more than 2,000 g/eq, such as no more than 1,000 g/eq, such as no more than 560 g/eq, such as no more than 200 g/eq. According to the present invention, the epoxy equivalent weight of the epoxy-containing component of the adhesive composition can range from 99 g/eq to 2,000 g/eq, such as from 180 g/eq to 1,000 g/eq, such as from 520 g/eq to 560 g/eq. As used herein, the "epoxy equivalent weight" is determined by dividing the molecular weight of the epoxy-containing component by the number of epoxy groups present in the epoxy-containing component.

According to the present invention, the molecular weight (Mw) (performed as described above) of the epoxy-containing component of the adhesive composition may be at least 198 g/mol, such as at least 222 g/mol, such as at least 370 g/mol, such as at least 1,000 g/mol, and in some cases no more than 20,000 g/mol, such as no more than 4,000 g/mol, such as no more than 2,000 g/mol, such as no more than 1,100 g/mol, such as no more than 400 g/mol, such as no more than 300 g/mol. According to the present invention, the molecular weight of the epoxy-containing component of the adhesive composition can range from 198 g/mol to 20,000 g/mol, such as from 222 g/mol to 4,000 g/mol, such as from 370 g/mol to 2,000 g/mol, such as from 1,000 g/mol to 1,100 g/mol.

The adhesive composition according to the present invention may optionally further comprise elastomeric particles. As used herein, "elastomeric particles" refers to particles having glass transition temperature (Tg) of −70° C. to 0° C. The elastomeric particles may have a core/shell structure. Suitable core-shell elastomeric particles may be comprised of butadiene rubber or other synthetic rubbers, such as styrene-butadiene and acrylonitrile-butadiene and the like, butyl acrylate, and/or 2-ethylhexyl acrylate. The type of elastomeric particles and the concentration thereof is not limited as long as the particle size falls within the specified range as illustrated below.

According to the present invention, the average particle size of the elastomeric particles may be from 0.02 to 500 microns (20 nm to 500,000 nm), for example, the reported particle size for rubber particles provided by Kanekea Texas Corporation, as measured by standard techniques known in the industry, such as, for example, according to ISO 13320 and ISO 22412.

According to the present invention, the elastomeric particles may optionally be included in an epoxy carrier resin for introduction into the adhesive composition. Suitable finely dispersed core-shell elastomeric particles in an average particle size ranging from 50 nm to 250 nm may be master-batched in epoxy resin such as aromatic epoxides, phenolic novolac epoxy resin, bisphenol A and/or bisphenol F diepoxide, and/or aliphatic epoxides, which include cyclo-aliphatic epoxides, at concentrations ranging from 5% to 40% rubber particles by weight based on the total weight of the rubber dispersion, such as from 20% to 35%. Suitable epoxy resins may also include a mixture of epoxy resins. When utilized, the epoxy carrier resin may be an epoxy-containing component of the present invention such that the weight of the epoxy-containing component present in the structural adhesive composition includes the weight of the epoxy carrier resin.

Exemplary non-limiting commercial core-shell elastomeric particle products using poly(butadiene) rubber particles that may be utilized in the adhesive composition of the present invention include a core-shell poly(butadiene) rubber dispersion (25% rubber by weight) in bisphenol F (commercially available as Kane Ace MX 136), a core-shell poly(butadiene) rubber dispersion (33% rubber by weight) in Epon® 828 (commercially available as Kane Ace MX 153), a core-shell poly(butadiene) rubber dispersion (37% rubber by weight) in bisphenol A (commercially available as Kane Ace MX 257), and a core-shell poly(butadiene) rubber dispersion (37% rubber by weight) in bisphenol F (commercially available as Kane Ace MX 267), each available from Kaneka Texas Corporation.

Exemplary non-limiting commercial core-shell elastomeric particle products using styrene-butadiene rubber particles that may be utilized in the adhesive composition include a core-shell styrene-butadiene rubber dispersion (33% rubber by weight) in low viscosity bisphenol A (commercially available as Kane Ace MX 113), a core-shell styrene-butadiene rubber dispersion (25% rubber by weight) in bisphenol A (commercially available as Kane Ace MX 125), a core-shell styrene-butadiene rubber dispersion (25% rubber by weight) in D.E.N.™-438 phenolic novolac epoxy (commercially available as Kane Ace MX 215), a core-shell styrene-butadiene rubber dispersion (25% rubber by weight) in Araldite® MY-721 multi-functional epoxy (commercially available as Kane Ace MX 416), a core-shell styrene-butadiene rubber dispersion (25% rubber by weight) in MY-0510 multi-functional epoxy (commercially available as Kane Ace MX 451), a core-shell styrene-butadiene rubber dispersion (25% rubber by weight) in Syna Epoxy 21 Cyclo-aliphatic Epoxy from Synasia (commercially available as Kane Ace MX 551), and a core-shell styrene-butadiene rubber dispersion (25% rubber by weight) in polypropylene glycol (MW 400) (commercially available as Kane Ace MX 715), each available from Kaneka Texas Corporation.

The elastomeric particles may be present in the adhesive composition in an amount of at least 1% by weight based on the total composition weight, such as at least 6%, such as at least 11%, and in some cases may be present in the adhesive composition in an amount of no more than 42% by weight based on the total composition weight, such as no more than 37%, such as no more than 32%. According to the present invention, the elastomeric particles may be present in the adhesive composition in an amount of from 1% to 42% by weight based on the total composition weight, such as from 6% to 37%, such as from 11% to 32%.

According to the present invention, the curing component comprising a blocked polyisocyanate in the adhesive composition includes the curing component described above and therefore is not repeated here.

The blocked polyisocyanate may be present in the adhesive composition of the present invention in an amount of at least 5% by weight, such as at least 10% by weight, such as at least 20% by weight, and may be present in an amount of no more than 50% by weight, such as no more than 40% by weight, such as no more than 30% by weight, based on the total weight of the adhesive composition. The blocked polyisocyanate may be present in the adhesive composition in an amount of 5% to 50% by weight, such as 20% to 40% or 10% to 30% by weight, based on the total weight of the adhesive composition.

The introduction of the curing component in the amounts disclosed herein into the adhesive compositions of the present invention may provide improved mechanical properties to the joint formed between two substrates, such as wedge impact.

According to the present invention, the adhesive composition optionally may further comprise a latent curing catalyst. As used herein, the term "latent curing catalyst" refers to a catalyst that is activated by an external energy source.

Useful latent curing catalysts may comprise amidoamine or polyamide catalysts, such as, for example, one of the Ancamide® products available from Air Products, amine, dihydrazide, or dicyandiamide adducts and complexes, such as, for example, one of the Ajicure® products available from Ajinomoto Fine Techno Company, dicyandiamide (A.K.A. Dyhard) available from Alz Chem, 3,4-dichlorophenyl-N,N-dimethylurea (A.K.A. Diuron) available from Alz Chem, or combinations thereof.

According to the present invention, when utilized, the latent curing catalyst may be present in the adhesive composition in an amount of at least 0.1% by weight based on the total composition weight, such as at least 2%, such as at least 5%, and in some cases may be present in the adhesive composition in an amount of no more than 10% by weight based on the total composition weight, such as no more than 5%, such as no more than 2%. According to the present invention, when utilized, the secondary latent curing catalyst may be present in the adhesive composition in an amount from 0.1% to 10% by weight based on the total composition weight, such as from 2% to 5%.

According to the present invention, the adhesive composition may optionally further comprise a solvent, such as an alcohol, methyl isobutyl ketone, propylene glycol methyl ether, or propylene glycol propyl ether. The solvent may be present in the adhesive composition in an amount from 1 to 5% by weight based on the total composition weight of the adhesive composition. Alternatively, according to the present invention, the adhesive composition may be substantially free, or in some cases completely free, of solvent. An adhesive composition is substantially free of solvent if solvent is present in an amount of less than 2% by weight, based on the total composition weight of the adhesive composition.

According to the present invention, reinforcement fillers may optionally be added to the adhesive composition. Useful reinforcement fillers that may be introduced to the adhesive composition of the present invention to provide improved mechanical properties include fibrous materials such as fiberglass, fibrous titanium dioxide, whisker type calcium carbonate (aragonite), and carbon fiber (which includes graphite and carbon nanotubes). In addition, fiber glass ground to 5 microns or wider and to 50 microns or longer may also provide additional tensile strength. Such reinforcement fillers, if utilized, may comprise from 0.5% to 25% by weight based on the total composition weight.

Optionally, according to the present invention, additional fillers, thixotropes, colorants, tints and/or other materials also may be added to the adhesive composition.

Useful thixotropes that may be used include untreated fumed silica and treated fumed silica, Castor wax, clay, organo clay and combinations thereof. In addition, fibers such as synthetic fibers like Aramid® fiber and Kevlar® fiber, acrylic fibers, and/or engineered cellulose fiber may also be utilized.

Useful colorants or tints may include red iron pigment, titanium dioxide, calcium carbonate, and phthalocyanine blue and combinations thereof.

Useful fillers that may be used in conjunction with thixotropes may include inorganic fillers such as inorganic clay or silica and combinations thereof.

Exemplary other materials that may be utilized include, for example, calcium oxide and carbon black and combinations thereof.

The present invention is also directed towards a method for preparing an adhesive composition of the present invention as described above, the method comprising, or in some cases consisting of, or in some cases consisting essentially of, mixing the epoxy-containing component and the curing component and optionally any further ingredient, if used, at a temperature of less than 50° C., such as from 0° C. to 50° C., such as from 25° C. to 40° C.

The present invention is also directed to a method for forming a bond between two substrates comprising, or in some cases consisting of, or in some cases consisting essentially of, applying the adhesive composition described above to a first substrate; contacting a second substrate to the adhesive composition such that the adhesive composition is located between the first substrate and the second substrate; and curing the adhesive composition, such as, for example, by applying an external energy source.

The adhesive composition described above may be applied alone or as part of an adhesive system that can be deposited in a number of different ways onto a number of different substrates. The adhesive system may comprise a number of the same or different adhesive layers and may further comprise other coating compositions such as pretreatment compositions and the like. An adhesive layer is typically formed when an adhesive composition that is deposited onto the substrate is at least partially cured by methods known to those of ordinary skill in the art (e.g., by exposure to thermal heating).

The adhesive composition can be applied to the surface of a substrate in any number of different ways, non-limiting examples of which include brushes, rollers, films, pellets, spray guns and applicator guns.

After application to the substrate, the adhesive composition can be cured, such as by baking and/or curing at elevated temperature, such as at a temperature of at least 80° C., such as at least 100° C., such as at least 120° C., such as at least 125° C., such as at least 130° C., and in some cases at a temperature of no more than 200° C., such as no more than 180° C., such as no more than 170° C., such as no more than 165° C., and in some cases at a temperature of from 80° C. to 200° C., from 120° C. to 180° C., from 125° C. to 170° C., from 130° C. to 165° C., and for any desired time period (e.g., from 5 minutes to 1 hour) sufficient to at least partially cure the adhesive composition on the substrate(s).

After the adhesive composition is applied to a substrate and at least partially cured, the bonded substrate(s) may be evaluated for wedge impact. The wedge impact test evaluates the fracture behavior of adhesively bonded joints when subjected to impact. The wedge impact is measured according to ISO 11343. An acceptable value in the automotive industry, for example, may be at least 10 N/mm, such as at least 15 N/mm. After the adhesive composition is applied to a substrate and at least partially cured, the bonded substrate(s) may demonstrate a wedge impact of at least 15 N/mm (measured according to ISO 11343 by CEAST 9350), such as at least 16 N/mm, such as at least 17 N/mm. Accordingly, it has been surprisingly found that the use of the curing component comprising a blocked polyisocyanate curing agent in the adhesive composition of the present invention results in improved wedge impact performance compared to an adhesive composition that does not include. For example, the wedge impact may be improved by at least 50% compared to a comparative adhesive composition that does not include an a blocked polyisocyanate curing agent, such as at least 60%, such as at least 75%, such as at least 90%, such as at least 100%.

As stated above, the present disclosure is directed to adhesive compositions that are used to bond together two substrate materials for a wide variety of potential applications in which the bond between the substrate materials provides particular mechanical properties related to lap shear strength and/or T-peel strength. The adhesive composition may be applied to either one or both of the substrate materials being bonded such as, by way of non-limiting example, components of an automobile frame. The pieces are aligned and pressure and/or spacers may be added to control bond thickness. The adhesive composition may be cured using an external source such as an oven (or other thermal means) or through the use of actinic radiation (UV light, etc.).

Suitable substrate materials that may be bonded by the adhesive compositions of the present invention include, but are not limited to, materials such as metals or metal alloys, glass, natural materials such as wood, polymeric materials such as hard plastics, or composite materials. The adhesives of the present invention are particularly suitable for use in various automotive or industrial applications.

Illustrating the invention are the following examples that are not to be considered as limiting the invention to their details. All parts and percentages in the examples, as well as throughout the specification, are by weight unless otherwise indicated.

EXAMPLES

Curing Component Preparation

Example 1

A blocked isocyanate was prepared from the following charges:

| Ingredients | Parts by weight |
|---|---|
| Charge #1 | |
| Mondur MLQ[1] | 100.6 |
| DBTDL[2] | 0.02 |
| Epon 828[3] | 106.0 |
| Charge #2 | |
| Terathane 1000[4] | 200.0 |
| Charge #3 | |
| Dibutyl glycolamide[5] | 63.2 |

[1]Mondur MLQ is commercially available from Covestro.
[2]DBTDL is Dibutyl tin dilaurate and commercially available from Arkema Inc
[3]Epon 828 is commercially available from Hexion Specialty Chemicals.
[4]Terathane 1000 is commercially available from Invista.
[5]Dibutyl glycolamide is available from PPG.

Charge 1 was added to a 1000 mL, 4-necked flask equipped with a motor driven stainless steel stir blade, a water-cooled condenser, a nitrogen blanket, and a heating mantle with a thermometer connected through a temperature feedback control device. The reaction mixture was heated to 80° C. At 80° C., charge 2 was added into reaction mixture dropwise over 30 minutes. After addition, the reaction mixture was held at 80° C. until isocyanate equivalent was stalled (NCO EQ WT=1200). Then reaction mixture was cooled to 70° C. and followed by an addition of charge 3 over 1 hour. The reaction mixture was held at 70° C. until IR spectroscopy showed the absence of the characteristic NCO band (2269 cm-1) using the Thermo Scientific Nicolet iS5 FT-IR. The reaction product was poured out at 70° C. The Mw of blocked isocyanate was 7402 as determined by Gel Permeation Chromatography relative to linear polystyrene standards of 800 to 900,000 Da and may be performed using Waters 2695 separation module with a Waters 2414 differential refractometer (RI detector). Tetrahydrofuran (THF) was used as the eluent at a flow rate of 1 ml min$^{-1}$, and two PL Gel Mixed C columns were used for separation at room temperature.

Example 2

A blocked isocyanate was prepared from the following charges:

| Ingredients | Parts by weight |
|---|---|
| Charge #1 | |
| Mondur MLQ[1] | 100.6 |
| DBTDL[2] | 0.02 |
| Epon 828[3] | 106.0 |
| Charge #2 | |
| Terathane 1000[4] | 200.0 |
| Charge #3 | |
| Butyl glycolamide[5] | 44.2 |

[1]Mondur MLQ is commercially available from Covestro.
[2]DBTDL is Dibutyl tin dilaurate and commercially available from Arkema Inc
[3]Epon 828 is commercially available from Hexion Specialty Chemicals.
[4]Terathane 1000 is commercially available from Invista.
[5]Butyl glycolamide is available from PPG.

Charge 1 was added to a 1000 mL, 4-necked flask equipped with a motor driven stainless steel stir blade, a water-cooled condenser, a nitrogen blanket, and a heating mantle with a thermometer connected through a temperature feedback control device. The reaction mixture was heated to 80° C. At 80° C., charge 2 was added into reaction mixture dropwise over 30 minutes. After addition, the reaction mixture was held at 80° C. until isocyanate equivalent was stalled (NCO EQ WT=1200.9). Then reaction mixture was cooled to 70° C. and followed by an addition of charge 3 over 1 hour. The reaction mixture was held at 70° C. until IR spectroscopy showed the absence of the characteristic NCO band (2269 cm-1) using the Thermo Scientific Nicolet iS5 FT-IR. The reaction product was poured out at 70° C. The Mw of blocked isocyanate was 7168, determined as described in Example 1.

Example 3

A blocked isocyanate was prepared from the following charges:

| Ingredients | Parts by weight |
|---|---|
| Charge #1 | |
| Mondur MLQ[1] | 100.6 |
| DBTDL[2] | 0.02 |
| Epon 828[3] | 106.0 |
| Charge #2 | |
| Terathane 1000[4] | 200.0 |
| Charge #3 | |
| Butyl lactamide[5] | 51.6 |

[1]Mondur MLQ is commercially available from Covestro.
[2]DBTDL is Dibutyl tin dilaurate and commercially available from Arkema Inc
[3]Epon 828 is commercially available from Hexion Specialty Chemicals.
[4]Terathane 1000 is commercially available from Invista.
[5]Butyl lactamide is available from PPG.

Charge 1 was added to a 1000 mL, 4-necked flask equipped with a motor driven stainless steel stir blade, a water-cooled condenser, a nitrogen blanket, and a heating mantle with a thermometer connected through a temperature feedback control device. The reaction mixture was heated to 80° C. At 80° C., charge 2 was added into reaction mixture dropwise over 30 minutes. After addition, the reaction mixture was held at 80° C. until isocyanate equivalent was stalled (NCO EQ WT=1139.6). Then reaction mixture was cooled to 70° C. and followed by an addition of charge 3 over 1 hour. The reaction mixture was held at 70° C. until IR spectroscopy showed the absence of the characteristic NCO band (2269 cm-1) using the Thermo Scientific Nicolet iS5 FT-IR. The reaction product was poured out at 70° C. The Mw of blocked isocyanate was 7532, determined as described in Example 1.

Example 4

A blocked isocyanate was prepared from the following charges:

| Ingredients | Parts by weight |
| --- | --- |
| Charge #1 | |
| Mondur TDS Grade E[1] | 69.6 |
| DBTDL[2] | 0.02 |
| Epon 828[3] | 106.0 |
| Charge #2 | |
| Terathane 1000[4] | 200.0 |
| Charge #3 | |
| Butyl lactamide[5] | 65.7 |

[1]Mondur TDS Grade E is commercially available from Covestro.
[2]DBTDL is Dibutyl tin dilaurate and commercially available from Arkema Inc
[3]Epon 828 is commercially available from Hexion Specialty Chemicals.
[4]Terathane 1000 is commercially available from Invista.
[5]Butyl lactamide is available from PPG.

Charge 1 was added to a 1000 mL, 4-necked flask equipped with a motor driven stainless steel stir blade, a water-cooled condenser, a nitrogen blanket, and a heating mantle with a thermometer connected through a temperature feedback control device. The reaction mixture was heated to 80° C. At 80° C., charge 2 was added into reaction mixture dropwise over 30 minutes. After addition, the reaction mixture was held at 80° C. until isocyanate equivalent was stalled (NCO EQ WT=826.1). Then reaction mixture was cooled to 70° C. and followed by an addition of charge 3 over 1 hour. The reaction mixture was held at 70° C. until IR spectroscopy showed the absence of the characteristic NCO band (2269 cm-1) using the Thermo Scientific Nicolet iS5 FT-IR. The reaction product was poured out at 70° C. The Mw of blocked isocyanate was 5092, determined as described in Example 1.

Comparative Example 5

A blocked isocyanate was prepared from the following charges:

| Ingredients | Parts by weight |
| --- | --- |
| Charge #1 | |
| Mondur TDS Grade E[1] | 69.6 |
| DBTDL[2] | 0.02 |
| Epon 828[3] | 106.1 |
| Charge #2 | |
| Terathane 1000[4] | 200.1 |
| Charge #3 | |
| Butnanol[5] | 24.1 |

[1]Mondur TDS Grade E is commercially available from Covestro.
[2]DBTDL is Dibutyl tin dilaurate and commercially available from Arkema Inc
[3]Epon 828 is commercially available from Hexion Specialty Chemicals.
[4]Terathane 1000 is commercially available from Invista.
[5]Butanol is commercially available from BASF.

Charge 1 was added to a 1000 mL, 4-necked flask equipped with a motor driven stainless steel stir blade, a water-cooled condenser, a nitrogen blanket, and a heating mantle with a thermometer connected through a temperature feedback control device. The reaction mixture was heated to 80° C. At 80° C., charge 2 was added into reaction mixture dropwise over 30 minutes. After addition, the reaction mixture was held at 80° C. until isocyanate equivalent was stalled (NCO EQ WT=1149.1). Then reaction mixture was cooled to 70° C. and followed by an addition of charge 3 over 1 hour. The reaction mixture was held at 70° C. until IR spectroscopy showed the absence of the characteristic NCO band (2269 cm-1) using the Thermo Scientific Nicolet iS5 FT-IR. The reaction product was poured out. The Mw of blocked isocyanate was 5447, determined as described in Example 1.

Adhesive Composition Preparation

The structural adhesive master batch composition was prepared by mixing the ingredients listed in Table 1. Mixing was carried out in a plastic container at room temperature between 20° C. and 40° C. using a DAC600.1 FVZ Speedmixer™ asymmetric centrifugal mixer to form the adhesive composition.

TABLE 1

| Materials | |
| --- | --- |
| Materials | Parts |
| KaneAce MX 153 available from Kaneka Texas | 64.0 |
| HyPox ® DA323 Available from CVC Thermoset Specialties | 14.0 |
| Dyhard 100SF available from AlzChem LLC. | 4.5 |
| Adjicure PN 50 available A&CCatalysts, Inc. | 1.3 |
| DakotaPure ™ 3000 Mica available from Pacer Minerals | 2.7 |
| Wollastonite NYAD 400 available from NYCO/Imers | 2.7 |
| Total Weight | 89.1 |

Adhesive examples #1 through #6 were prepared by mixing either Epon Resin 828 (Modified Adhesive #1) or glycolamide blocked isocyanate (Modified Adhesives #2 to #6) to the adhesive master batch (made above) as indicated in Table 2 below. Mixing was carried out in a plastic container at a temperature between 20° C. and 40° C. by using a DAC600 FVZ Speedmixer™ asymmetric centrifugal mixer to form the adhesive composition.

Wedge Impact Strength Test

The adhesive compositions were tested for wedge impact strength according to ISO 11343. Three specimens were prepared for each test condition. The substrate used was 0.73 mm thick cold rolled steel (CRS) (purchased from ACT Test Panels LLC) shaped into test coupons as detailed in the ISO method. Adhesive was applied to the raised end of the coupon to an area 20 mm x 30 mm. The thickness of the adhesive was maintained with 0.25 mm diameter using glass spacer beads. Bond assemblies were clamped together with spring loaded clips and excess adhesive was removed with a spatula. The test pieces were cured in an oven at 135° C. for 17 minutes. Bonds were tested using an Instron model CEAST 9350 run at ambient temperature.

Data are reported in Table 2 and demonstrate that inclusion of the inventive curing agent (Example #2 to #5) improve wedge impact strength compared to comparative Example #6, which was significantly outperformed by adhesive compositions that included curing agent of Examples #2 to #5.

TABLE 2

Adhesive Compositions

| | Modified Adhesive | | | | | |
|---|---|---|---|---|---|---|
| | #1 | #2 | #3 | #4 | #5 | #6 |
| Master batch Adhesive | 89.1 | 89.1 | 89.1 | 89.1 | 89.1 | 89.1 |
| Epon Resin 828* | 10.0 | | | | | |
| Example #1 | | 10.0 | | | | |
| Example #2 | | | 10.0 | | | |
| Example #3 | | | | 10.0 | | |
| Example #4 | | | | | 10.0 | |
| Example #5 | | | | | | 10.0 |
| Wedge Impact N/mm | 17.3 | 16.1 | 15.7 | 15.7 | 15.9 | 1.0** |

*Epon Resin 828 available from Hexion
**No appreciable resistance

Viscosity Measurements

Adhesive viscosity was measured with an Anton Paar Physica MCR 301 rheometer with 25 mm parallel plate and 1 mm gap. Shear condition for the measurement was as follows: Conditioning: Rotation with shear rate at 0.1 s$^{-1}$ for 60 seconds; Tempering: No shear for 240 seconds; Amplitude test: Oscillation with log increasing strain y from 0.01 to 10% in 90 seconds (data measured every 3 seconds); Shear phase: Oscillation with 10% strain (y) at 10 Hz for 120 seconds (data measured every 10 seconds); Re-conditioning: Rotation with shear rate at 0.1 s$^{-1}$ for 60 seconds; Regenerated mode: Oscillation with 0.05% strain (y) for 120 seconds (data measured every 10 seconds).

Complex viscosity 17*Al, measured at the condition of y=0.05% (at 21 seconds), of Adhesive #2 was measured for its initial value, after 3 days at 40° C. Samples were conditioned to 35° C. before each measurement. Results of those measurements are shown in Table 3 and demonstrate that the adhesive composition of the present invention remains stable following three day storage at 40° C.

TABLE 3

| | Viscosity (mPa · s) | |
|---|---|---|
| 40° C. Storage | Day = 0 Viscosity mPa · s | Day = 3 Viscosity mPa · s |
| Adhesive #1 | 1.70E+05 | 1.95E+05 |

Aspects of the Invention

In the following, some non-limiting aspects of the present invention are summarized:

1. An adhesive composition comprising:
   an epoxy-containing component; and
   a blocked polyisocyanate curing agent comprising a blocking group derived from a blocking agent comprising an alpha-hydroxy amide, ester, or thioester, or a combination thereof.
2. The adhesive composition according to preceding Aspect 1, wherein the epoxy-containing component is present in an amount of 50% to 95% by weight based on total composition weight.
3. The adhesive composition according to any one of preceding Aspects 1 or 2, wherein the epoxy-containing component comprises an epoxy-capped flexibilizer.
4. The adhesive composition according to any one of the preceding Aspects, wherein the blocked polyisocyanate curing agent is present in an amount of 5% to 50% based on total composition weight.
5. The adhesive composition according to any one of the preceding Aspects, wherein the blocked polyisocyanate comprises a second blocking group derived from a blocking agent comprising an alcohol, a phenolic compound, a tertiary hydroxyl amine, an oxime, an amine, or a combination thereof.
6. The adhesive composition according to any one of the preceding Aspects, wherein the blocking agent comprising alpha-hydroxy amide, ester or thioester, comprises a compound of the structure:

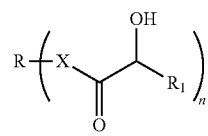

wherein X is N(R$_2$), O, S; n is 1 to 4; when n=1 and X=N(R$_2$), R is hydrogen, a C$_1$ to C$_{10}$ alkyl group, an aryl group, a polyether, a polyester, a polyurethane, a hydroxy-alkyl group, or a thio-alkyl group; when n=1 and X=O or S, R is a C$_1$ to C$_{10}$ alkyl group, an aryl group, a polyether, a polyester, a polyurethane, a hydroxy-alkyl group, or a thio-alkyl group; when n=2 to 4, R is a multi-valent C$_1$ to C$_{10}$ alkyl group, a multi-valent aryl group, a multi-valent polyether, a multi-valent polyester, a multi-valent polyurethane; each R$_1$ is independently hydrogen, a C$_1$ to C$_{10}$ alkyl group, an aryl group, or a cycloaliphatic group; each R$_2$ is independently hydrogen, a C$_1$ to C$_{10}$ alkyl group, an aryl group, a cycloaliphatic group, a hydroxy-alkyl group, or a thio-alkyl group; and R and R$_2$ together can form a cycloaliphatic, heterocyclic structure.

7. The adhesive composition according to any one of the preceding Aspects, wherein the blocking agent comprises an alpha-hydroxy amide blocking agent.
8. The adhesive composition according to Aspect 7, wherein the alpha-hydroxy amide blocking agent comprises an alkyl glycolamide and/or an alkyl lactamide.
9. The adhesive composition according to Aspect 8, wherein the alkyl glycolamide or the alkyl lactamide comprise a compound of the structure:

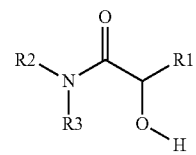

wherein R1 is hydrogen or a methyl group; R2 is a C$_1$ to C$_{10}$ alkyl group; and R3 is a C$_1$ to C$_{10}$ alkyl group.

10. The adhesive composition according to any one of Aspects 8 or 9, wherein the alkyl glycolamide or the alkyl lactamide comprise a compound of the structure:

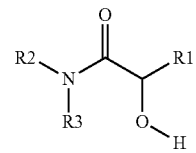

wherein R1 is hydrogen or a methyl group; R2 is a $C_1$ to $C_{10}$ alkyl group; and R3 is hydrogen.

11. The adhesive composition according to any one of Aspects 8 to 10, wherein the alkyl glycolamide comprises a $C_1$ to $C_{10}$ mono-alkyl glycolamide.

12. The adhesive composition according to any one of Aspects 8 to 11, wherein the alkyl lactamide comprises a $C_1$ to $C_{10}$ mono-alkyl lactamide.

13. The adhesive composition according to any one of Aspects 8 to 12, wherein the alkyl lactamide comprises a racemic lactamide.

14. The adhesive composition according to any one of Aspects 8 to 13, wherein the blocking group derived from the alpha-hydroxy amide, ester or thioester blocking agent comprise at least 10% of the total blocked isocyanato groups of the blocked polyisocyanate.

15. The adhesive composition according to any of the preceding Aspects, wherein the blocked polyisocyanate curing agent has an Mw of 250 to 10,000 as measured by gel permeation chromatography using polystyrene calibration standards.

16. The adhesive composition according to any of the preceding Aspects, wherein the viscosity of the adhesive composition is $10^2$ MPa·s to $10^5$ MPa·s (measured with an Anton Paar Physica MCR 301 rheometer with 25 mm parallel plate and 1 mm gap at the following shear conditions: Conditioning: Rotation with shear rate at 0.1 s$^{-1}$ for 60 seconds; Tempering: No shear for 240 seconds; Amplitude test: Oscillation with log increasing strain from 0.01 to 10% in 90 seconds (data measured every 3 seconds); Shear phase: Oscillation with 10% strain (y) at 10 Hz for 120 seconds (data measured every 10 seconds); Re-conditioning: Rotation with shear rate at 0.1 s$^{-1}$ for 60 seconds; Regenerated mode: Oscillation with 0.05% strain (y) for 120 seconds (data measured every 10 seconds)).

17. The adhesive composition according to any of the preceding Aspects, further comprising elastomeric particles.

18. The adhesive composition according to Aspect 17, wherein the elastomeric particles have a core/shell structure.

19. The adhesive composition according to any of the preceding Aspects, further comprising a curing catalyst.

20. The adhesive composition according to any of the preceding Aspects, wherein the adhesive composition is a one component composition.

21. An adhesive comprising the composition according to any of the preceding Aspects in a cured state.

22. An article comprising:
a first substrate;
a second substrate;
an adhesive comprising the adhesive composition according to any one of Aspects 1 to 20 in a cured state positioned between the first and second substrates.

23. The article according to Aspect 22, wherein the adhesive has a wedge impact strength of at least 15 N/mm (measured according to ISO 11343 by CEAST 9350).

24. A method for forming a bond between two substrates comprising: applying the adhesive composition of any of Aspects 1 to 20 to a first substrate; contacting a second substrate to the adhesive composition such that the adhesive composition is located between the first substrate and the second substrate; and applying an external energy source to cure the adhesive composition.

25. The method of Aspect 24, wherein the curing comprises thermal heating to a temperature of at least 80° C.

26. An adhesive composition, comprising:
an epoxy-containing component; and
a blocked polyisocyanate curing agent according to structure:

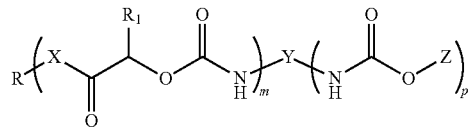

wherein Y represents the residue of a polyisocyanate; m≥1; and n≥0; X is N(R$_2$), O, S; when X=N(R$_2$), R is hydrogen, a $C_1$ to $C_{10}$ alkyl group, an aryl group, a polyether, a polyester, a polyurethane, a hydroxy-alkyl group, or a thio-alkyl group; when X=O or S, R is a $C_1$ to $C_{10}$ alkyl group, an aryl group, a polyether, a polyester, a polyurethane, a hydroxy-alkyl group, or a thio-alkyl group; each R$_1$ is independently hydrogen, a C1 to $C_{10}$ alkyl group, an aryl group, or a cycloaliphatic group; when m≥2, R is optionally a multi-valent $C_1$ to $C_{10}$ alkyl group, a multi-valent aryl group, a multi-valent polyether, a multi-valent polyester, a multi-valent polyurethane; each R$_2$ is independently hydrogen, a C1 to $C_{10}$ alkyl group, an aryl group, a cycloaliphatic group, a hydroxy-alkyl group, or a thio-alkyl group; R and R$_2$ together can form a cycloaliphatic, heterocyclic structure; and O—Z represents the residue of a second blocking agent.

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

We claim:

1. An adhesive composition comprising:
50 to 90% by weight, based on total composition weight, of an epoxy-containing component;
5 to 40% by weight, based on total composition weight, of a blocked polyisocyanate curing agent comprising at least one blocking group derived from an alpha-hydroxy amide blocking agent, an alpha-hydroxy ester blocking agent, or an alpha-hydroxy thioester blocking agent; and
0.1 to 10% by weight, based on total composition weight, of a latent curing catalyst.

2. The adhesive composition of claim 1, wherein the epoxy-containing component is present in an amount of 50% to 80% by weight, based on total composition weight.

3. The adhesive composition of claim 1, wherein the epoxy-containing component comprises an epoxy-capped flexibilizer.

4. The adhesive composition of claim 1, wherein the blocked polyisocyanate curing agent is present in an amount of 5% to 30% by weight, based on total composition weight.

5. The adhesive composition of claim 1, wherein the blocked polyisocyanate curing agent further comprises at least one blocking group derived from an alcohol blocking agent, a phenolic compound blocking agent, a tertiary hydroxyl amine blocking agent, an oxime blocking agent, or an amine blocking agent.

6. The adhesive composition of claim 1, wherein the alpha-hydroxy amide blocking agent, the alpha-hydroxy ester blocking agent, or the alpha-hydroxy thioester blocking agent is represented by the following structure:

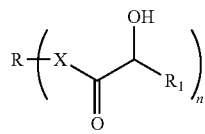

wherein:

X is N(R$_2$), O, or S; and n is 1 to 4;

when n=1 and X═N(R$_2$), R is hydrogen, a C$_1$ to C$_{10}$ alkyl group, an aryl group, a polyether, a polyester, a polyurethane, a hydroxy-alkyl group, or a thio-alkyl group;

when n=1 and X═O or S, R is a C$_1$ to C$_{10}$ alkyl group, an aryl group, a polyether, a polyester, a polyurethane, a hydroxy-alkyl group, or a thio-alkyl group;

when n=2 to 4, R is a multi-valent C$_1$ to C$_{10}$ alkyl group, a multi-valent aryl group, a multi-valent polyether, a multi-valent polyester, or a multi-valent polyurethane;

each R$_1$ is independently hydrogen, a C$_1$ to C$_{10}$ alkyl group, an aryl group, or a cycloaliphatic group;

each R$_2$ is independently hydrogen, a C$_1$ to C$_{10}$ alkyl group, an aryl group, a cycloaliphatic group, a hydroxy-alkyl group, or a thio-alkyl group; and R and R$_2$ together can form a cycloaliphatic, heterocyclic structure.

7. The adhesive composition of claim 1, wherein the blocked polyisocyanate curing agent comprises at least one blocking group derived from an alpha-hydroxy amide blocking agent.

8. The adhesive composition of claim 7, wherein the blocked polyisocyanate curing agent comprises at least one blocking group derived from an alkyl glycolamide blocking agent and/or at least one blocking group derived from an alkyl lactamide blocking agent.

9. The adhesive composition of claim 8, wherein the alkyl glycolamide blocking agent or the alkyl lactamide blocking agent is represented by the following structure:

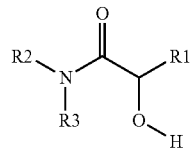

wherein R1 is hydrogen or a methyl group; R2 is a C$_1$ to C$_{10}$ alkyl group; and R3 is a C$_1$ to C$_{10}$ alkyl group.

10. The adhesive composition of claim 8, wherein the alkyl glycolamide blocking agent or the alkyl lactamide blocking agent is represented by the following structure:

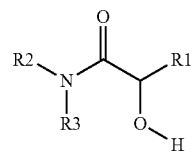

wherein R1 is hydrogen or a methyl group; R2 is a C$_1$ to C$_{10}$ alkyl group; and R3 is hydrogen.

11. The adhesive composition of claim 8, wherein the alkyl glycolamide blocking agent comprises a C$_1$ to C$_{10}$ mono-alkyl glycolamide.

12. The adhesive composition of claim 8, wherein the alkyl lactamide blocking agent comprises a C$_1$ to C$_{10}$ mono-alkyl lactamide.

13. The adhesive composition of claim 8, wherein the alkyl lactamide blocking agent comprises a racemic lactamide.

14. The adhesive composition of claim 1, wherein the at least one blocking group derived from an alpha-hydroxy amide blocking agent, an alpha-hydroxy ester blocking agent, or an alpha-hydroxy thioester blocking agent is present for at least 10% of the total blocked isocyanato groups of the blocked polyisocyanate.

15. The adhesive composition of claim 1, wherein the blocked polyisocyanate curing agent has an Mw of 250 to 10,000 as measured by gel permeation chromatography using polystyrene calibration standards.

16. The adhesive composition of claim 1, further comprising elastomeric particles.

17. The adhesive composition of claim 16, wherein the elastomeric particles have a core/shell structure.

18. The adhesive composition of claim 1, wherein the adhesive composition is a one component composition.

19. A cured adhesive comprising the adhesive composition of claim 1 in a cured state.

20. An article comprising:
a first substrate;
a second substrate;
a cured adhesive comprising the adhesive composition of claim 1 in a cured state positioned between the first and second substrates.

21. The article of claim 20, wherein the cured adhesive has a wedge impact strength of at least 15 N/mm (measured according to ISO 11343 by CEAST 9350).

22. A method for forming a bond between two substrates comprising:
applying the adhesive composition of claim 1 to a first substrate;
contacting a second substrate to the adhesive composition such that the adhesive composition is located between the first substrate and the second substrate; and
applying an external energy source to cure the adhesive composition.

23. The method of claim 22, wherein the applying of an external energy source comprises thermal heating to a temperature of at least 80° C.

24. An adhesive composition, comprising:
50 to 90% by weight, based on total composition weight, of an epoxy-containing component;
5 to 40% by weight, based on total composition weight, of a blocked polyisocyanate curing agent; and
0.1 to 10% by weight, based on total composition weight, of a latent curing catalyst;
wherein the blocked polyisocyanate curing agent is represented by the following structure:

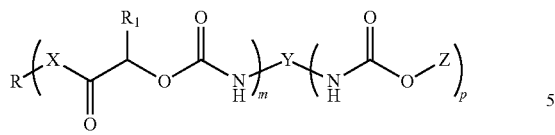

wherein:
  Y represents the residue of a polyisocyanate;
  $m \geq 1$, $p \geq 0$, and $m+p \geq 2$;
  X is $N(R_2)$, O, or S;
  when $X=N(R_2)$, R is hydrogen, a $C_1$ to $C_{10}$ alkyl group, an aryl group, a polyether, a polyester, a polyurethane, a hydroxy-alkyl group, or a thio-alkyl group;
  when X=O or S, R is a $C_1$ to $C_{10}$ alkyl group, an aryl group, a polyether, a polyester, a polyurethane, a hydroxy-alkyl group, or a thio-alkyl group;
  each $R_1$ is independently hydrogen, a $C_1$ to $C_{10}$ alkyl group, an aryl group, or a cycloaliphatic group;
  when $m \geq 2$, R is optionally a multi-valent $C_1$ to $C_{10}$ alkyl group, a multi-valent aryl group, a multi-valent polyether, a multi-valent polyester, or a multi-valent polyurethane;
  each $R_2$ is independently hydrogen, a $C_1$ to $C_{10}$ alkyl group, an aryl group, a cycloaliphatic group, a hydroxy-alkyl group, or a thio-alkyl group;
  R and $R_2$ together can form a cycloaliphatic, heterocyclic structure; and
  O—Z represents the residue of a second blocking agent.

* * * * *